United States Patent Office 3,213,933
Patented Oct. 26, 1965

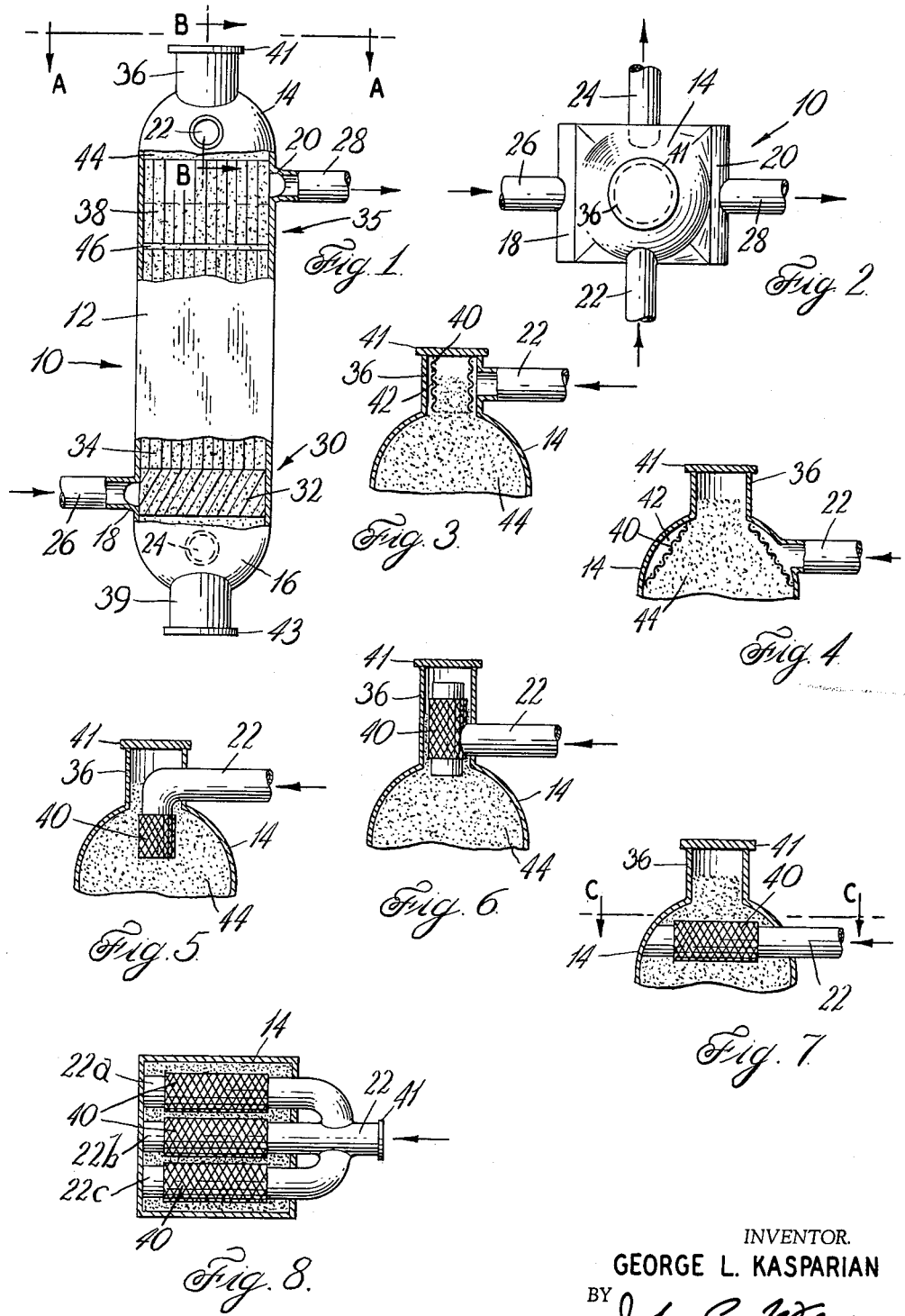
Oct. 26, 1965  G. L. KASPARIAN  3,213,933
PLATE AND FIN TYPE HEAT EXCHANGER
Filed April 29, 1963
INVENTOR.
GEORGE L. KASPARIAN
BY John C. _____
ATTORNEY

3,213,933
PLATE AND FIN TYPE HEAT EXCHANGER
George L. Kasparian, Williamsville, N.Y., assignor to Union Carbide Corporation, a corporation of New York
Filed Apr. 29, 1963, Ser. No. 276,360
2 Claims. (Cl. 165—104)

This invention relates to plural stream heat exchangers of the plate-and-fin type. More particularly, the present invention relates to such heat exchangers for providing heat exchange between fluids, at least one of which is in the presence of a particled material acting as either a chemical catalyst or a physical reacting material.

The plate-and-fin type heat exchanger of the present invention is partciularly useful in chemical conversion processes which require the presence of a catalyst material. A preferred use is for either continuous or isothermal catalytic ortho-para conversion of a hydrogen product stream in the presence of particled hydrous iron oxide or chromic oxide wherein the exothermic heat of reaction must be removed as rapidly as possible by heat exchange with another stream and with small temperature differences between the streams. The present invention is also well-suited for other chemical processes which require heat exchange between fluids, at least one of which being in the presence of a particled material not necessarily of the catalyst type. For example, certain particled materials such as particled activated charcoal or molecular sieve are useful for selectively absorbing or adsorbing one fluid from another, thereby effecting either a chemical or a physical reaction or separation, depending on the nature of the particled material. Furthermore, the present invention is useful for providing gas-to-gas, gas-to-liquid and liquid-to-liquid heat exchange.

A primary object of the present invention is to provide an improved heat exchanger of the plate-and-fin type which is suitable for use in processes requiring heat exchange of at least one fluid stream with another, at least one stream being in the presence of a particled material. Another object is to provide such a heat exchanger which is suitable for use in processes requiring simultaneous heat exchange and catalytic conversion of at least one fluid stream. A further object is to provide such a heat exchanger which is convenient to fill with a particled material and to empty particled material therefrom. Still another object is to provide such a heat exchanger wherein the particled material leakage into the heat exchanger inlet and outlet for the fluid stream passing through the particled material is prevented. These and other objects and advantages of the present invention are described hereinafter in detail in conjunction with the figures, of which:

FIGURE 1 is a vertical view of a plate-and-fin type of heat exchanger in partial cross-section illustrating the present invention;

FIGURE 2 is a top view of the heat exchanger of FIGURE 1 taken along the lines A—A;

FIGURES 3–7 are elevational views of the upper section of a plate-and-fin type of heat exchanger which illustrates modifications of the heat exchanger of FIGURE 1 taken along the lines B—B;

FIGURE 8 is a top view of the upper section of a heat exchanger similar to FIGURE 7 taken along the lines C—C.

In general, the present invention comprises an improvement of the plate-and-fin type of heat exchanger which permits its use in systems requiring the heat exchange of at least one stream in the presence of a particled material acting either as a chemical catalyst, or as a physical reactant such as an adsorbent material. This heat exchanger comprises a core section constructed of a plurality of fluid passes (fluid pass sets) for each of the fluid streams to be conducted through the heat exchanger, and inlet and outlet headers for each fluid stream attached to the core section in fluid communication with the respective fluid pass sets. Each fluid pass contains multiple flow passages formed by fin sections.

The fluid pass set for at least one fluid stream contains a particled material, and the inlet and outlet headers in fluid communication with the fluid passes in such fluid pass set are constructed to: (1) retain the particled material therein; (2) maintain the fluid pass set full of the particled material; and (3) permit convenient particled material filling and emptying. These three features are provided by constructing the inlet and outlet headers of such fluid pass set with separate fluid stream and particled material inlets and outlets, respectively. In addition, porous members (fluid-permeable and particled-material-impervious members) are interposed between the fluid inlet and outlet of the respective headers and the interior of such headers, and are constructed and arranged to prevent particled material leakage into the fluid stream inlet and outlet. If required, more than one fluid inlet, or outlet, or both may be provided in the respective headers in which case either the same porous member or multiple porous members may be interposed between the fluid stream inlets and outlets and the respective header interiors, depending on the design of such porous members.

In the preferred embodiments of the present invention, the inlet and outlet headers for at least one of the fluid pass sets containing the particled material are of the dome-type which enclose the top and bottom of the heat exchanger core section, respectively, in fluid communication with the fluid passes in the fluid pass set.

FIGURES 1 and 2 show a plate-and-fin type heat exchanger 10 having a core section 12 and inlet and outlet headers 14, 16, 18 and 20 for two fluid streams with respective fluid inlets and outlets 22, 24, 26 and 28 therefor. The broken-away section 30 in the lower section of heat exchanger 10 illustrates the use of a fluid distributor 32 and a corrugated-fin type fluid pass 34 for one of the fluid streams. The broken-away section 35 in the upper section of heat exchanger 10 illustrates a corrugated-fin type fluid pass 38 for the other fluid stream. In two-fluid heat exchangers of the type shown in FIGURES 1 and 2, the respective fluid passes in the core section 12 for each stream are usually stacked in alternate fashion with the respective headers communicating with such alternate fluid passes. If more than two fluid streams must be accommodated in the heat exchanger, suitable stacking arrangements and headers may be provided in accordance with procedures well known in the art. The dome inlet and outlet headers, 14 and 16, in addition to being provided with a fluid inlet and outlet, 22 and 24, are also provided with a particled material inlet and outlet, 36 and 39, respectively. Pressure-tight covers such as flanges 41 and 43 close the particled material inlet and outlet 36 and 39, respectively.

FIGURES 3–7 show particular embodiments of the interior of dome inlet header 14 of FIGURES 1 and 2. These same embodiments are equally well suited for use as dome outlet header 16 of FIGURE 1. Therefore, the following discussion with reference to these figures, although concerned with dome inlet header 14 of FIGURES 1 and 2, is applicable to the dome outlet header 16 of FIGURE 1.

FIGURE 3 shows the interior of a dome inlet header 14 wherein a porous member 40 in the configuration of a cylinder is interposed between the fluid inlet 22 and the dome inlet header interior such that an annular space 42 is provided around fluid inlet 22 which remains free of particled material 44. Such an arrangement permits introducing particled material 44 into the respective fluid passes and withdrawing the same therefrom without disturbing the dome header piping arrangement. Such an arrangement also permits adequately containing the particled material 44 within the respective fluid passes, since the interior of the dome header must be at least partially filled with particled material 44 to insure complete filling of the respective fluid passes. Porous member 40 is preferably constructed of wire screen layers having a cross-section pore size less than the size of the particled material 44. Porous member 40 may also be constructed of a porous sintered metal layer, a perforated metal layer, or the like, so long as the pore size of such material is less than the size of the particled material 44.

FIGURE 4 shows the interior of a dome inlet header 14 wherein a porous member 40 in the configuration of a truncated cone or pyramid is interposed between the fluid inlet 22 and the dome inlet header interior to prevent particled material 44 from leaking into the fluid inlet 22. In this arrangement, the porous member 40 should be installed such that the angle of inclination of the porous member 40 is steeper than the angle of repose of the particled material 44 so that the entire space surrounded by the porous member 40 may be filled without leaving voids.

FIGURES 5, 6, 7 and 8 show the interior of a dome inlet header 14 wherein the inner-end section of a fluid inlet 22 is provided with a porous member 40. These arrangements, and particularly FIGURE 7, are particularly suitable where multiple fluid inlets (22a, 22b and 22c of FIGURE 8) are desired. In these arrangements, the inlet-end section of the fluid inlet 22 may be perforated and a porous member 40 in the configuration of a close-fitting sleeve installed either inside or outside of the perforated section.

The inner-end section of fluid inlet 22 of FIGURES 7 and 8 may also be extended across the dome header interior and attached to opposite sides of the dome header as shown to reinforce the end sections of the core section against overstressing due to internal pressure forces. This arrangement of the fluid inlet 22 may be used in addition to transverse tension rods extending across the ends of the core section which are commonly used to prevent overstressing, or as a substitute for such tension rods.

At least partially filling the dome inlet header with particled material is an important feature of the present invention. This not only insures complete filling of the respective fluid passes within the core section, but also provides for uniform fluid distribution across the dome inlet header. This facilitates uniform distribution of the fluid within the respective fluid passes inasmuch as the fluid pressure drop through the particled material within the dome inlet header is substantially equal in all directions.

It is often advantageous to employ at least two heat exchangers in series where a product stream is to be warmed or cooled over a wide temperature range. Where such a series arrangement is desired for use in the present invention, two or more heat exchangers such as 10 in FIGURE 1 may be vertically connected in series, for example by connecting the particled material outlet 39 of one to the particled material inlet 36 of the other, and by connecting the fluid outlet 24 of one to the fluid inlet 22 of the other. In such an arrangement, no intermediate porous members in series are required since the particled material will be contained within the appropriate series connecting means as well as in the series-connected heat exchanger core sections by the porous members on each end of the series arrangement.

The individual fluid passages of each fluid pass are commonly formed by orienting corrugated fin sections end-to-end, the number of such adjacent sections depending on the length of the fluid passes. When adjacent fin sections are installed, close longitudinal alignment of the fluid passages may not occur resulting in the obstruction of such fluid passages by particled material at the interface between adjacent passages during particled catalyst material filling. To facilitate particled material filling and emptying and to prevent the aforementioned plugging at adjacent fin sections, adjacent fin sections are preferably arranged to provide small gaps 46 between adjacent fin sections as shown in FIGURE 1. Such gaps are wider than the largest particled material dimension to insure uniform unrestricted particled material flow through the fluid passage of each fluid pass during particled material filling and emptying of the respective fluid passes. To further facilitate particled material filling and emptying, the dome headers and porous members are preferably vertically oriented as shown in the figures to make use of gravity forces during such filling and emptying. Furthermore, for such vertically oriented heat exchangers, the fluid flow direction is preferably downward to help maintain the normal packed density of the bed and to prevent fluidization and pulverizing of the particled material.

To make most efficient use of the large heat transfer surfaces provided by heat exchangers of the plate-and-fin type, the ratio of the minimum width dimension of the individual fluid passages in each fluid pass containing particled catalyst material to the diameter of the particled particles should be greater than 3 and less than 100, a preferred ratio being between 3 and 25. Also, the smallest transverse dimension of each fluid passage containing particled material should not be less than about 0.05 inch and the greatest transverse dimension of each such fluid passage should not exceed about 1.0 inch and the cross-sectional area of each such fluid passage should not exceed about 1.0 sq. in.

Although preferred embodiments of the present invention have been described in detail, it is contemplated that certain features may be used without others or modified and still be within the scope of the present invention.

What is claimed is:

1. In a plate-and-fin type heat exchanger which comprises a core section having a set of fluid passes for each of at least two fluid streams with multiple flow passages in each set of fluid passes for providing heat exchange between the fluid streams passing through their respective set of fluid passes and wherein at least one set of said fluid passes is packed with particled material, said heat exchanger having inlet and outlet means for each fluid stream, the improvement therein which comprises: an inlet header at one end of the said plate-and-fin type heat exchanger in open fluid communication with the said set of fluid passes packed with particled material, said inlet means for one of said fluid streams opening into said inlet header and a particled material inlet to said inlet header, and an outlet header at the other end of the said plate-and-fin type heat exchanger in open fluid communication with the said set of fluid passes packed with particled material, said outlet means for the fluid stream passing through the said set of fluid passes packed with particled material opening into said outlet header, and a particled material outlet to said outlet header, such headers being packed with particled material as to thereby confine particled material within the said set of fluid passes packed with particled material; a fluid-permeable, particled-material-impervious member disposed within each of said inlet and outlet headers in position to prevent particled material leakage into the respective fluid inlet and fluid outlet of said headers and such that the interiors of said headers are open to the respective particled material inlet and outlet.

2. In a series of apparatus according to claim 1 wherein the said outlet means for the fluid passing through the set of fluid passes packed with particled material of a first of said plate-and-fin type heat exchangers is connected to the said inlet means for the fluid passing through the set of fluid passes packed with particled material of a second of said plate-and-fin type heat exchangers and wherein the said particled material inlet of the first of said plate-and-fin type heat exchangers is connected to the said particled material outlet of the second of said plate-and-fin type heat exchangers; one of said fluid-permeable, particled-material-impervious members being disposed within the dome inlet header of the first of said plate-and-fin type heat exchangers and a second of said fluid-permeable, particled-material-impervious members being disposed within the dome outlet header of the second of said plate-and-fin type heat exchangers, both of said fluid-permeable, particled-material-impervious members in position in their respective headers to prevent particled material leakage into the respective fluid inlet and fluid outlet of said headers, and such that the interiors of said headers are open to the respective particled material inlet and outlet.

References Cited by the Examiner
UNITED STATES PATENTS

| | | | |
|---|---|---|---|
| 1,309,514 | 7/19 | Empis | 165—104 |
| 2,185,929 | 1/40 | Simpson et al. | 165—104 X |
| 2,585,984 | 2/52 | Alexander et al. | 165—104 |
| 2,852,545 | 9/58 | Jenny | 165—104 |
| 2,895,719 | 7/59 | Blaskowski | 165—104 |
| 2,919,118 | 12/59 | Hunter | 165—104 |

CHARLES SUKALO, *Primary Examiner.*

KENNETH W. SPRAGUE, *Examiner.*